(12) United States Patent
Kameyama (10) Patent No.: US 6,899,802 B2
(45) Date of Patent: May 31, 2005

(54) METHOD FOR RECYCLING OF PLATING SOLUTIONS

(75) Inventor: Koujiro Kameyama, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/813,251

(22) Filed: Mar. 30, 2004

(65) Prior Publication Data

US 2004/0256235 A1 Dec. 23, 2004

(30) Foreign Application Priority Data

Jun. 13, 2003 (JP) .................................. P. 2003-169687

(51) Int. Cl.$^7$ .............................................. C25D 21/18
(52) U.S. Cl. ........................... 205/98; 205/81; 205/99; 205/101; 205/252; 205/300
(58) Field of Search ............................. 205/81, 82, 98, 205/99, 101, 252, 253, 254, 300, 302

(56) References Cited

U.S. PATENT DOCUMENTS

| | | | | |
|---|---|---|---|---|
| 4,405,412 A | * | 9/1983 | Nardelli | 205/99 |
| 5,510,014 A | * | 4/1996 | Murayama | 205/101 |
| 6,406,608 B1 | * | 6/2002 | Uzoh et al. | 205/101 |
| 6,596,148 B1 | * | 7/2003 | Belongia et al. | 205/99 |

* cited by examiner

*Primary Examiner*—Roy King
*Assistant Examiner*—William T. Leader
(74) *Attorney, Agent, or Firm*—Fish & Richardson P.C.

(57) ABSTRACT

In the conventional plating process, plating solutions are newly prepared and the plating solutions used previously are dumped as industrial wastes, which is accompanied by environmental loads, effluent costs, costs for purchasing new solutions, and the like, and the present invention can recycle a foemer plating solution to prepare a new plating solution, for example, in the following order: a process for preparing a Sn—Bi alloy plating solution (S1); a process for an active carbon treatment to remove the completing agent (S2); a process for removing Bi (S3); a process for a sedimenting treatment (S4); and a process for analyzing and correcting Sn plating solution. The recycling of plating solutions eliminates their effluent treatment and reduces environmental loads, effluent costs, and costs for purchasing new solutions. In the administration of the plating solution compositions, the conventional data can be utilized to facilitate the administrating operation.

8 Claims, 5 Drawing Sheets

METHOD FOR RECYCLING OF PLATING SOLUTIONS

BACKGROUND OF THE INVENTION

1. Field of the Invention

The present invention relates to a method for recycling of plating solutions by removing one metallic material from an alloy plating solution containing two kinds of metallic materials which differ in standard electrode potential, and preparing a single metal plating solution substantially from the remaining other metallic material.

2. Related Art

When coated with a plating film of Sn alone or Sn alloy, conductive materials such as leads or lead frames can have excellent conductivity and mechanical strength. The conductive materials can also have the corrosion resistance and excellent solderability that are possessed by Sn alone or Sn alloy. For these features, the conductive members are often used in the field of electric and electronic devices such as various terminals, connectors, and leads, and the field of electric power cables.

On the other hand, when semiconductor chips are mounted on circuit boards, the outer lead parts of the semiconductor chips are coated with plated films so as to improve their solderability. A typical example of these plated films is soldering (Sn—Pb alloy) which is widely used for its excellent solderability, corrosion resistance, and other preferable properties.

As described above, one of the most popular conventional plating solutions is Sn—Pb alloy plating solutions. However, in recent years, the influence of lead on the environment and humans has been drawing attention and use of Sn—Pb alloy plating solutions containing lead has been on the decline globally or withdrawn from service. Consequently, at the same time, the Sn—Pb alloy plating solutions have come to be replaced by Sn—Bi alloy plating solutions which can provide the same level of qualities. At the same time, there are also shifts towards new alloy plating solutions of Sn—Cu alloy, Sn—Ag alloy, Sn—In alloy, Sn—Zn alloy, and the like.

As described above, on the market, in consideration of the adverse affect of lead on the environment and humans, a shift toward plating solutions not containing lead is an urgent necessity. And a shift toward Sn—Bi alloy plating solutions which are stable in quality and plating techniques has made advancements.

On the other hand, there is a concern about the influence of Bi on the environment and humans and the toxicity of Bi. To be more specific, Bi itself exists as a mineral, and can also be obtained as a by-product in the production of lead. With fears that Bi maybe poisonous like lead, there is a concern that dumping Bi-containing plating solutions may affect the environment and humans as described above.

In semiconductor chips, the outer lead parts of the semiconductor chips are coated with plating films made from Sn—Bi alloy plating solutions so as to improve their solderability, corrosion resistance, and other properties, and then are mounted on circuit boards. At this time, the lead contained in the soldering during mounting and the Bi inside the plating films have the properties to facilitate the formation of a low-temperature alloy. The mounting region is vulnerable to heat stress for its structural feature, which causes a problem that the low-temperature alloy may decrease the mounting reliability.

In the recycling of conductive members, the Bi contained in the plating films that have been applied to their surfaces sometimes deposit by a fixed amount on the conductive members and remain there. In such a case, Bi exists in the recycled materials, which may induce a decrease in the strength of the recycled materials.

In the aforementioned situation, in the plating solutions market, there is a growing demand for a shift towards Sn plating solutions not containing a second metal such as Bi, and it is becoming necessary to make a shift towards plating solutions of Sn which is a substantially single metal as the plating solutions of a second generation.

In the plating solutions market, with the shift towards the Sn—Bi alloy plating solutions which are lead-free plating solutions as the first generation plating solutions, the conventional Sn—Pb alloy plating solutions are dumped or subjected to an effluent treatment, while Sn—Bi alloy plating solutions are newly mixed and prepared. In the preparation for the plating solutions of a second generation, the Sn—Bi alloy plating solutions used for the present plating can be dumped or subjected to an effluent treatment in the same manner, and Sn plating solutions can be newly mixed and prepared.

However, the shift towards Sn plating solutions following the shift from Sn—Pb alloy plating solutions to Sn—Bi alloy plating solutions involves a large amount of environmental loads, such as use of chemicals and an effluent treatment, and also involves the cost for the effluent treatment. On the other hand, it is necessary to newly purchase plating chemicals, thereby making the cost of manufacturing enormous.

In addition, newly preparing Sn plating solutions requires learning the know-how cultivated while the Sn—Bi alloy plating solutions are in use, such as chemical concentration control, electrodeposition ratio, plating techniques including plating film composition, and analysis technique, which consumes a great amount of time and cost. It is also necessary to newly install a production line for a plating treatment, which makes it harder to utilize the present facilities, thereby also requiring the cost of equipment.

SUMMARY OF THE INVENTION

In view of the aforementioned situations, the method for recycling of plating solutions of the present embodiment includes the steps of: preparing an alloy plating solution containing two kinds of metallic materials which differ in standard electrode potential, the metallic materials being co-deposited on a conductive member; and removing substantially all of one metallic material from the alloy plating solution, thereby preparing a single metal plating solution composed of the other metallic material. Therefore, in the method for recycling of plating solutions of the present embodiment, one metallic material is removed from the alloy plating solution which contains two kinds of metallic materials differing in standard electrode potential so as to prepare the plating solution composed of the other metallic material, which is used to apply the plating treatment to the surface of a conductive member.

The method for recycling of plating solutions of the present embodiment also includes that one of an additives contained in the alloy plating solution is a complexing agent; at least some of the complexing agent is removed from the alloy plating solution; and the other metallic material in the single metal plating solution is deposited at a nobler potential than the potential at which the two kinds of metallic materials in the alloy plating solution are co-deposited.

Therefore, in the method for recycling of plating solutions of the present embodiment, the removal of the complexing agent is provided for co-depositing the two kinds of metallic materials differing in standard electrode potential onto the surface of the conductive member, so that the other metallic material remaining in the prepared single metal plating solution is deposited on the surface of the conductive member at the nobler potential than in the alloy plating solution.

The method for recycling of plating solutions of the present embodiment further includes that the additives include an antioxidant; at least some of the antioxidant is removed together with the complexing agent; and the antioxidant is added to the single metal plating solution. Therefore, in the method for recycling of plating solutions of the present embodiment, the antioxidant in the alloy plating solution is removed together with the complexing agent, however, the removed antioxidant is added to the single metal plating solution to be prepared, thereby maintaining the quality of the plating solution.

The method for recycling of plating solutions of the present embodiment further includes that the one metallic material is bismuth, silver, copper, indium, or zinc, and the other metallic material is tin. Therefore, in the method for recycling of plating solutions of the present embodiment, a plating solution of substantially Sn alone can be prepared from alloy plating solutions containing various kinds of Sn as their main metal.

As described hereinbefore, first, the method for recycling of plating solutions of the present embodiment includes that the single metal plating solution is prepared by removing one metallic material from the alloy plating solution containing two kinds of metallic materials which differ in standard electrode potential. For the preparation of the single metal plating solution, the present embodiment can make use of data including the analysis method and the addition method in regard to the same ingredients as the alloy plating solution. As a result, the present embodiment can greatly reduce the time and cost for studying plating solutions as compared with the case where a plating solution is newly electrolytically bathed. Furthermore, in the administration of the plating solution compositions, the conventional data can be utilized to facilitate the administrating operation.

Second, the method for recycling of plating solutions of the present embodiment includes that the effluent treatment of plating solutions can be eliminated by the recycling of the plating solutions. This can greatly reduce the cost of the effluent treatment of plating solutions, the environmental loads due to the disposal of the plating solutions, and the cost of purchasing new plating solutions.

Third, the method for recycling of plating solutions of the present embodiment includes that a plating solution is newly prepared by removing an unnecessary metallic material from the alloy plating solution. Consequently, in the newly prepared single metal plating solution, the setting requirements during a plating process can be the same as in the alloy plating solution, which can provide a desired finished appearance including the shape of the deposited grains similar to the one obtained from the alloy plating solution.

Fourth, the method for recycling of plating solutions of the present embodiment includes that the preparation of a new plating solution from which the complexing agent has been removed can make the metallic material in the new solution have nobler potential, making a plating treatment more efficient.

DESCRIPTION OF PREFERRED EMBODIMENTS

Figure 1:
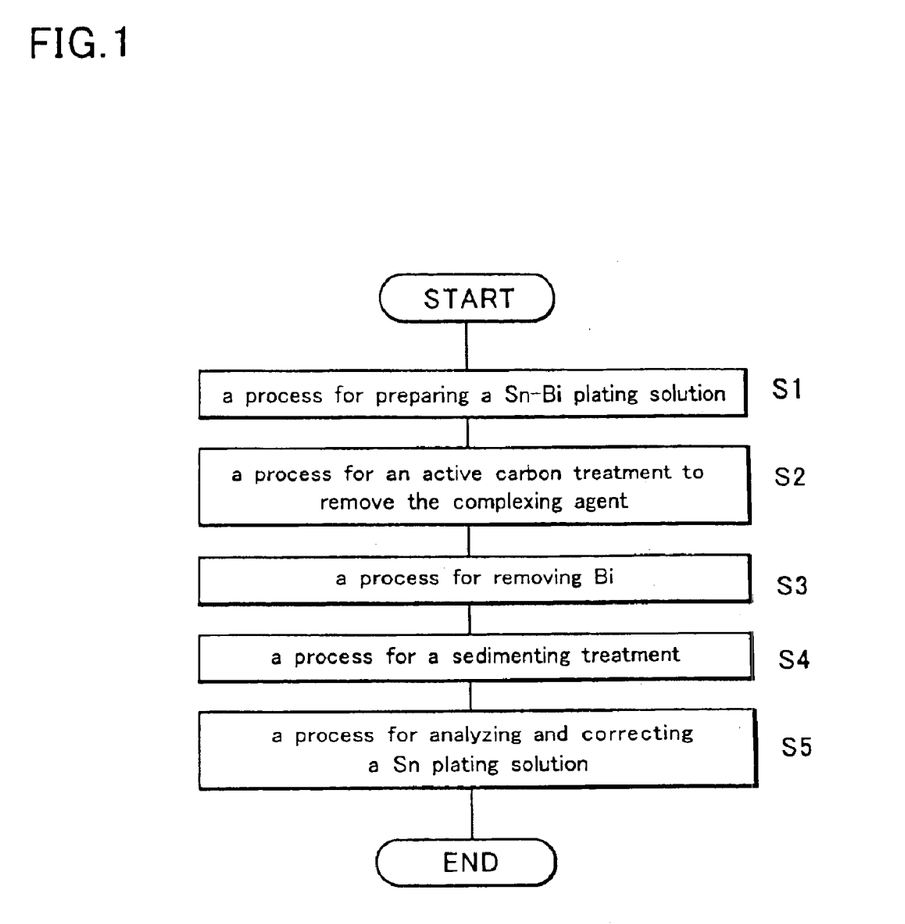
FIG. 1 is a flowchart to explain the method for recycling of plating solutions of the present embodiment by preparing a new plating solution from a former plating solution.
Figure 2A:
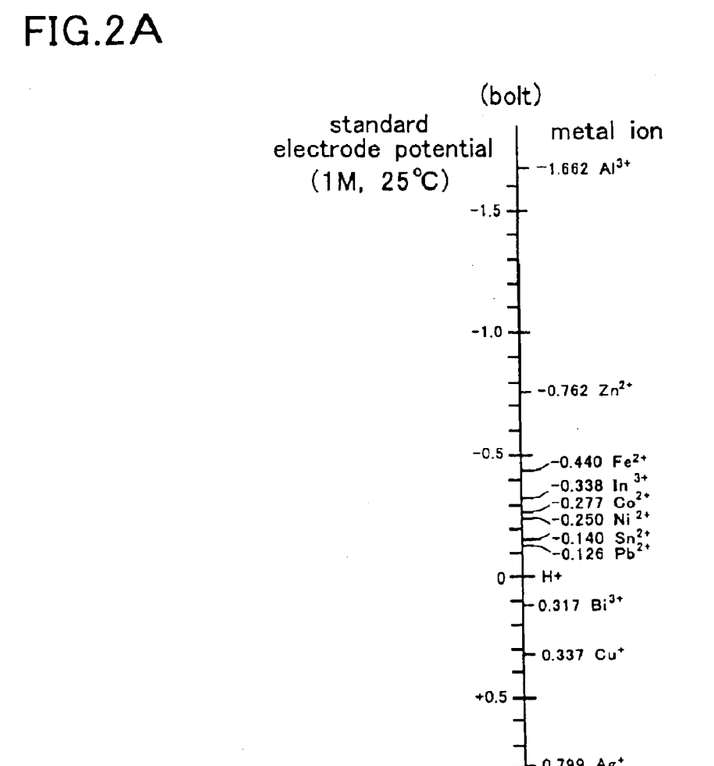
FIG. 2A is a characteristic diagram showing the standard electrode potentials of various metal ions and FIG. 2B is a characteristic diagram showing the depositing requirements at the respective metal ion potentials and current densities in a Sn—Bi alloy plating solution, which explains the method for recycling of plating solutions of the present embodiment.
Figure 2B:
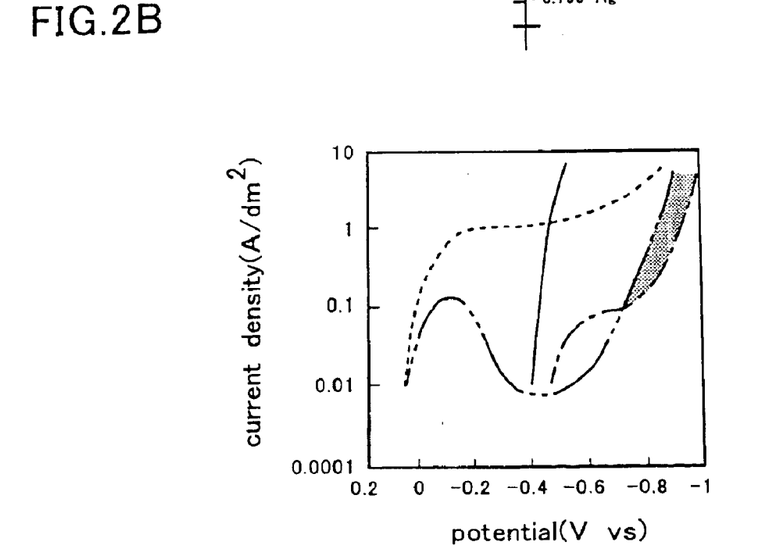
Figure 3:
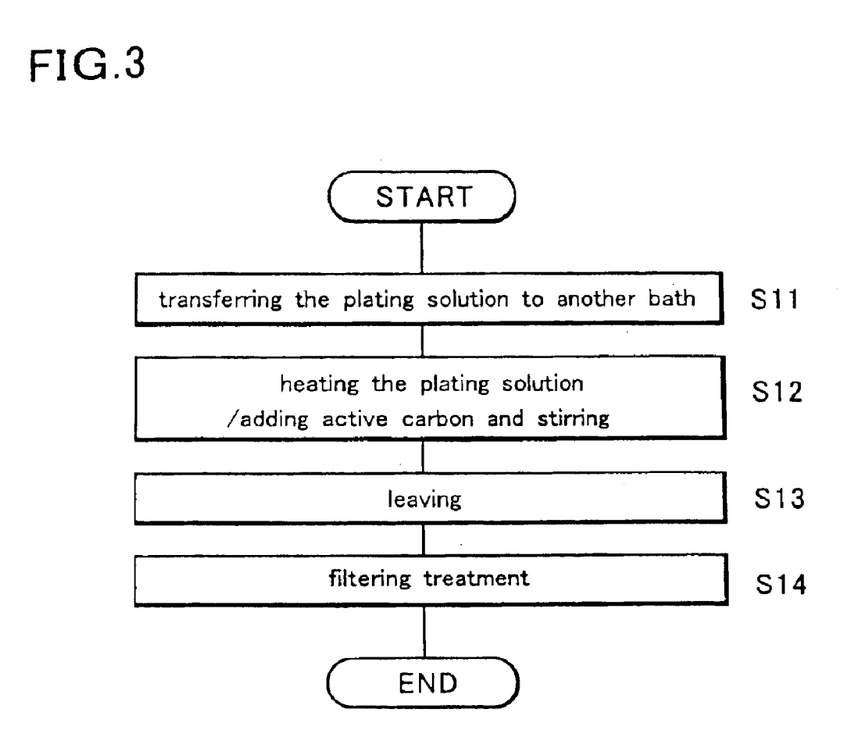
FIG. 3 is a flowchart to explain the active carbon treatment process in the method for recycling of plating solutions of the present embodiment.
Figure 4A:
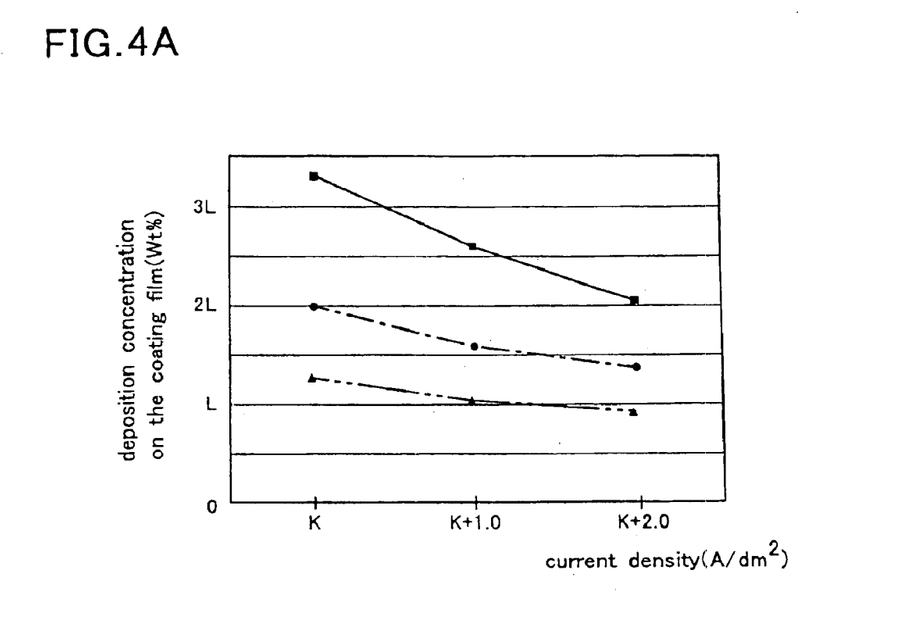
FIG. 4A is a characteristic diagram showing the relationship between the current density and the amount of Bi deposition in a Sn (tin)-Bi (bismuth) plating solution.
Figure 4B:
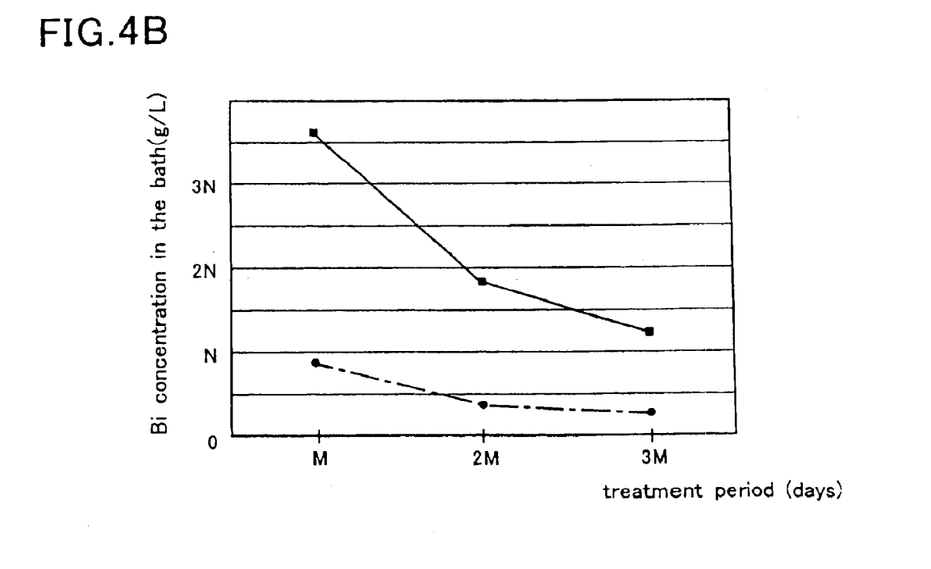
FIG. 4B is a characteristic diagram showing the relationship between the electrolysis treatment period and the Bi concentration in the bath in the Sn (tin)-Bi (bismuth) plating solution.
Figure 5:
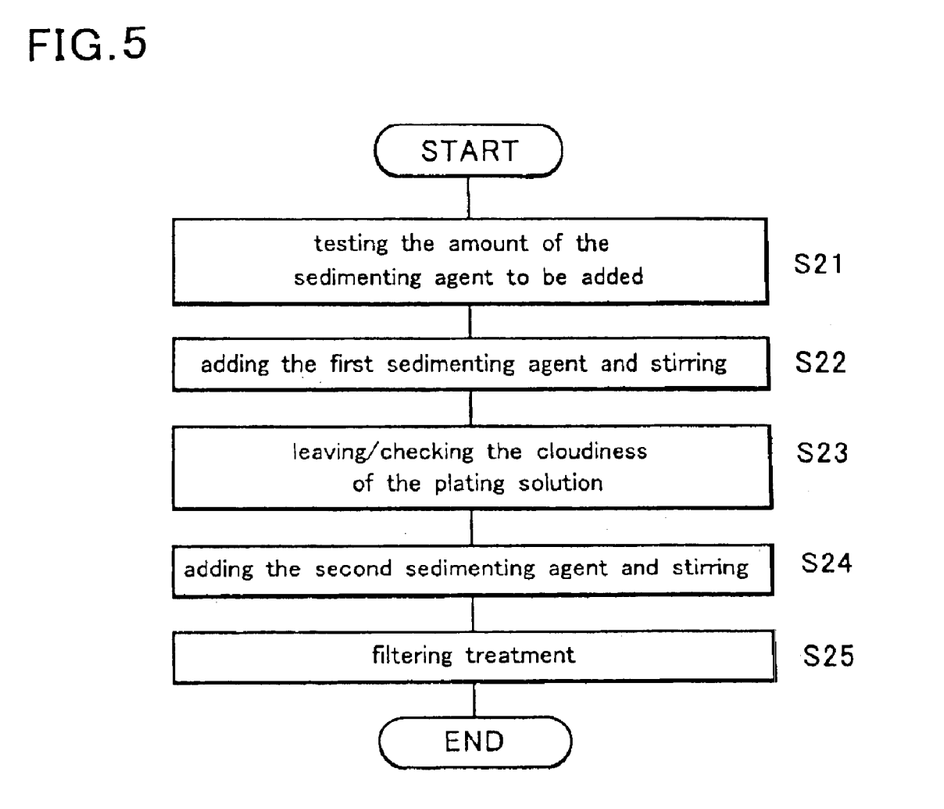
FIG. 5 is a flowchart to explain the sedimenting treatment process in the method for recycling of plating solutions of the present embodiment.

The method for recycling of plating solutions according to the present embodiment will be described in detail as follows with reference to FIG. 1 through FIG. 5. FIG. 1 is a flowchart to prepare a single metal plating solution from an alloy plating solution; FIG. 2A is a characteristic diagram showing the standard electrode potentials of various metal ions; FIG. 2B is a characteristic diagram showing the depositing requirements at the potentials and current densities of the respective metal ions in the Sn—Bi alloy plating solution; FIG. 3 is a flowchart to explain the process for an active carbon treatment; FIG. 4A is a characteristic diagram showing the relationship between the current densities and the amount of Bi deposition inside the Sn (tin)-Bi (bismuth) plating solution; FIG. 4B is a characteristic diagram showing the relationship between the electrolysis treatment period and Bi concentration in the bath in the Sn (tin)-Bi (bismuth) plating solution; and FIG. 5 is a flowchart to explain the process for a sedimenting treatment. The characteristic diagram shown in FIG. 2B is approximately the Sn—Bi alloy plating solution currently used for a plating treatment, and shows the depositing requirements in an embodiment.

In FIG. 1, the present embodiment describes the case of preparing a plating solution of Sn alone from a Sn—Bi alloy plating solution containing Sn and Bi as metallic materials. The process of preparing the plating solution of Sn alone is mainly composed of: a process (Step S1) for preparing a Sn—Bi alloy plating solution; an active carbon removing process (Step S2) for removing organic materials such as a complexing agent from the Sn—Bi alloy plating solution; a process (Step S3) for removing Bi from the Sn—Bi alloy plating solution; a sedimenting treatment process (Step S4) for removing unnecessary ingredients such as electrolytic products from the plating solution from which the complexing agent and Bi have been removed; and an analyzing and correcting process (Step S5) for correcting the unbalance of a plating solution of Sn alone due to the removal of Bi and the complexing agent. These processes will be described in detail as follows.

In the alloy plating solution, Sn is used as the main metallic material, and Bi is used as a second metallic material; however, Bi could be replaced by Ag (silver), Cu (copper), In (indium), or Zn (zinc) as the second metallic material. Although the recycling process of the plating solution is carried out based on the flowchart shown in FIG. 1 in the present embodiment, this is not the only possible order. For example, it is also possible to put the active carbon treatment process for removing the complexing agent of Step S2 after the process for the removal of Bi of Step S3. Thus, in the present embodiment, the order between Step S2 and Step S4 can be changed as desired.

First, the process for preparing the Sn—Bi alloy plating solution shown in Step S1 of FIG. 1 will be described as follows. The Sn—Bi alloy plating solution is mainly composed of water, acid, metallic materials, and additives. The acid can be alkane, or alkanesulfonic acid (organic acid), or the like. The Sn and Bi as the metallic materials are Sn powder and Bi powder which have been dissolved in a solvent containing isopropyl alcohol or the like, and which are contained as plating metal ions in the plating solution. In general, for the composition of a plating solution, metallic materials are dissolved in a solvent. However, the solvent is used in so small an amount in the plating solution that it never affects the composition of the plating solution even if its amount is slightly increased or decreased. The additives include approximately six kinds of ingredients including a surface active agent, an antioxidant, and a complexing agent. The complexing agent controls the deposition potentials of Sn ions ($Sn^{2+}$) and Bi ions ($Bi^{3+}$) which differ in deposition potential in the plating solution, thereby forming a plating film with a desired film quality.

The present embodiment shows the case where Bi is removed from the Sn—Bi alloy plating solution which is in an electrolytic bath, and the case where Bi is removed from the Sn—Bi alloy plating solution which has been applied to lead frames or the like. However, besides these cases, a Sn—Bi alloy plating solution in various other conditions can be used.

The Sn—Bi alloy plating solution in the electrolytic bath is administered so as to be maintained, for example, in the conditions of: a Sn ion ($Sn^{2+}$) concentration of 20 to 60 (g/L) a Bi ion ($Bi^{3+}$) concentration of 0.5 to 4.0 (g/L); a Sn/Bi ratio in the bath of 93/7 to 95/5; a free acid concentration of 120 to 160 (g/L); and an additive concentration of 20 to 40 (ml/L) On the other hand, the Sn—Bi alloy plating solution after having been applied to lead frames or the like is administered so as to be maintained, for example, in the conditions of: a Sn ion ($Sn^{2+}$) concentration of 15 to 60 (g/L); a Bi ion ($Bi^{3+}$) concentration of 0.3 to 3.0 (g/L); a Sn/Bi ratio in the bath of 93/7 to 95/5; a free acid concentration of 120 to 160 (g/L) an additive concentration of 20 to 35 (ml/L).

As described above, the Sn—Bi alloy plating solution contains Sn ions ($Sn^{2+}$) and Bi ions ($Bi^{3+}$). As shown in FIG. 2A, the standard electrode potential of Sn ion ($Sn^{2+}$) is approximately −0.140 (V), and the standard electrode potential of Bi ion ($Bi^{3+}$) is approximately 0.317 (V). This means that Bi ion ($Bi^{3+}$) is nobler than Sn ion ($Sn^{2+}$). Bi ions ($Bi^{3+}$) tend to take precedence in deposition over Sn ions ($Sn^{2+}$) in the regions of a low current density when the solution is deposited by an electrolysis method onto the surface of a conductive member such as a lead frame. Therefore, the Sn—Bi alloy plating solution contains a complexing agent for co-depositing two kinds of metal ions which differ in deposition potential onto the surface of a conductive member. The term "noble" mentioned above indicates the likelihood of to deposition as a metal.

The present embodiment describes the case of the Sn—Bi alloy plating solution; however, it is also possible to use a plating solution of a Sn—Ag alloy, Sn—Cu alloy, Sn—In alloy, or Sn—Zn alloy.

As shown in FIG. 2A, the standard electrode potential of an Ag ion ($Ag^+$) is approximately 0.799 (V), and the standard electrode potential of a Cu ion ($Cu^+$) is approximately 0.337 (V), which is nobler than Sn ion ($Sn^{2+}$). Therefore, adding a complexing agent enables the two kinds of metal ions which differ in standard electrode potential to co-deposit in a desired condition. On the other hand, the standard electrode potential of In ion ($In^{3+}$) is approximately −0.388 (V), and the standard electrode potential of Zn ion ($Zn^{2+}$) is approximately −0.763 (V), which indicates that Sn ion ($Sn^{2+}$) is a nobler metal ion than these. Therefore, adding a complexing agent enables the two kinds of metal ions which differ in standard electrode potential to co-deposit in a desired condition.

As shown in FIG. 2B, the solid line indicates the relationship between the deposition potential and current density of Sn ions ($Sn^{2+}$) in a Sn—Bi alloy plating solution containing no complexing agent. The dotted line indicates the relationship between the deposition potential and current density of Bi ions ($Bi^{3+}$) in a Sn—Bi alloy plating solution containing no complexing agent. As shown in the graph, in the case where a plating treatment is performed by the electrolysis method in the condition where no complexing agent is added to the Sn—Bi alloy plating solution, Bi ions ($Bi^{3+}$) take precedence in deposition at a current density of 1.0 ($A/dm^2$) or below. In other words, Bi ions ($Bi^{3+}$) having a nobler deposition potential take precedence in deposition on the surface of a conductive member such as a lead frame or the like, making it difficult to form a Sn—Bi alloy plating film with a desired film quality.

On the other hand, as shown in the graph, the chain line indicates the relationship between the deposition potential and current density of Sn ions ($Sn^{2+}$) in a Sn—Bi alloy plating solution containing the complexing agent. The two-dot chain line indicates the relationship between the deposition potential and current density of Bi ions ($Bi^{3+}$) in the Sn—Bi alloy plating solution containing the complexing agent. As shown in the graph, in the case where a plating treatment is performed by the electrolysis method in the condition where the Sn—Bi alloy plating solution contains the complexing agent, if the current density is set at around 0.1 ($A/dm^2$) or higher, Sn ions ($Sn^{2+}$) and Bi ions ($Bi^{3+}$) have similar deposition potentials, and Sn ions ($Sn^{2+}$) become nobler than Bi ions ($Bi^{3+}$) As a result, in the case where a plating treatment is applied to the complexing agent-containing alloy plating solution by the electrolysis method, a current density in the shaded region can be applied to form a Sn—Bi alloy plating film of a desired film quality onto the surface of a conductive member.

The following is a description about the process for removing the complexing agent from the Sn—Bi alloy plating solution prepared in the process of Step S1.

As described above, the Sn—Bi alloy plating solution contains the complexing agent to co-deposit Sn and Bi in a desired condition. Consequently, in the complexing agent-containing alloy plating solution, as shown in FIG. 2B, the deposition potential of Bi ions ($Bi^{3+}$) remains in the condition controlled by the complexing agent. In other words, when Bi ions ($Bi^{3+}$) are deposited on the surface of a conductive member, as apparent from the comparison between the dotted line and the two-dot chain line shown in FIG. 2B, the depositing efficiency of Bi can be improved by performing a removing treatment in the state of containing no complexing agent. Therefore, in this process, the complexing agent is removed from the Sn—Bi alloy plating solution so as to reregulate the deposition potential of Bi ions ($Bi^{3+}$) in the alloy plating solution, thereby returning the Bi depositing requirements from the two-dot chain line to the dotted line.

As shown in FIG. 3, in the active carbon treatment process, the complexing agent is removed from the Sn—Bi alloy plating solution. In this process, the alloy plating solution is first transferred from the plating bath for a plating treatment to a preliminary bath (Step S11). Then, for the removal of the complexing agent contained in the alloy plating solution transferred to the preliminary bath, powdered active carbon is added to the alloy plating solution while heating the solution. The active carbon is added 1 (kg) or so at a time, in accordance with a guideline of 10 (g) per unit liter, while stirring the plating solution. For the stirring, a motor stirring with a propeller shaft is preferable, and the gradual adding of the active carbon powder as mentioned above can prevent the active carbon from clogging at the bottom of the preliminary bath. In the present embodiment, this stirring operation is continued for approximately 16 hours consecutively so as to make the active carbon absorb organic matters such as the complexing agent (Step S12). Later, the plating solution is left for several hours (Step S13).

Finally, the plating solution which has been left at Step S13 is passed through the filter of a filtering device so as to remove from the plating solution the active carbon and the particles of organic matters in the plating solution such as the complexing agent absorbed by the active carbon. In the present embodiment, the grain of the filter is approximately 0.5 $\mu$m or approximately 1.0 $\mu$m, and the particle size of the active carbon is preferably larger than the filter grain. It is also possible to apply a filtering treatment operation to the plating solution after pre-coating the filter with a filter aid. When this filter aid is used, if the filter is clogged up, it can be solved by back washing (Step S14).

In the present embodiment, the active carbon treatment is performed after the Sn—Bi alloy plating solution is transferred to the preliminary bath; however, this is not the only order possible. The active carbon treatment can also be performed by disposing an active carbon filter in a part of the pipe for circulating the plating solution because in general, a plating solution is forcibly circulated.

The following is a description about the process for removing Bi from the Sn—Bi alloy plating solution from which the complexing agent shown in Step S3 of FIG. 1 has been removed. The removal of Bi from the Sn—Bi alloy plating solution is performed mainly by a replacement method or an electrolysis method.

In general, when the replacement method is used for the Sn—Bi alloy plating solution, Bi ions ($Bi^{3+}$) are replaced and deposited on conductive members such as lead frames and electrode plates which are to be the anode or the cathode. On the other hand, in the case of the electrolysis method, Sn ions ($Sn^{2+}$) and Bi ions ($Bi^{3+}$) are electrolytically co-deposited or partly replaced and deposited on conductive members such as lead frames and electrode plates which are to be the anode or the cathode. And in the case of the electrolysis method, the anode in the plating bath is made of Sn with a purity of 99.9% having the same composition as the electrode position, and the Sn ions ($Sn^{2+}$) which are a metallic material of the plating solution are compensated mainly by the dissolution of the anode. On the other hand, Bi ions ($Bi^{3+}$) more remarkably reduced than Sn ions ($Sn^{2+}$) are only deposited.

As described above, in the replacement method, a metal plate such as stainless steel, Cu, or Fe (iron) is soaked in the plating bath having the Sn—Bi alloy plating solution from which the complexing agent has been removed. According to the replacement method, no current is flown in the alloy plating solution. And on the surface of the soaked metal plate, in exchange for the oxidization and dissolution of metal ions from the metal plate, the metal ions in the solution, which are mainly Bi ions ($Bi^{3+}$) in the present embodiment, are reduced and deposited on the surface of the metal plate. On the other hand, almost no Sn ions ($Sn^{2+}$) leave from the plating solution because Bi ions ($Bi^{3+}$) take precedence in deposition due to the difference in deposition potentials. Thus, the desired Bi ions ($Bi^{3+}$) can be removed substantially and completely.

In the electrolysis method, on the other hand, a metal plate such as stainless steel plate, Cu, or Fe (iron) is soaked as the cathode in the plating bath having the Sn—Bi alloy plating solution from which the complexing agent has been removed. By using an anode made of Sn with a purity of 99.9%, current is flown in the plating solution so as to deposit Bi ions ($Bi^{3+}$) mainly on the cathode side. At this time, according to the electrolysis method, Sn ions ($Sn^{2+}$) are also deposited on the cathode side, which also decreases the Sn ions ($Sn^{2+}$) in the plating solution; however, as described above, Sn ions ($Sn^{2+}$) are compensated by the dissolution of the anode. This can realize a reduction in Bi ions ($Bi^{3+}$).

FIG. 4A shows the amount of Bi deposition in the case where a fixed level of current density is applied to each of the three kinds of Sn—Bi alloy plating solutions which differ in the concentration of Bi ions ($Bi^{3+}$) in the bath. The solid line indicates the alloy plating solution having the highest Bi ion ($Bi^{3+}$) concentration in the bath; the chain line indicates the alloy plating solution with a lower Bi ion ($Bi^{3+}$) concentration in the bath than the one in the solid line; and the two-dot chain line indicates the alloy plating solution having the lowest Bi ion ($Bi^{3+}$) concentration in the bath. In the present embodiment, three patterns of current density: $K(A/dm^2)$, $K+1.0$ ($A/dm^2$), and $K+2.0$ ($A/dm^2$) are applied to the respective Sn—Bi alloy plating solutions. As shown in the graph, regardless of the Bi ion ($Bi^{3+}$) concentration ratio in the bath, in all alloy plating baths, Bi is more greatly deposited at a lower current density, and the amount of its deposition decreases with increasing current density.

In FIG. 4B, when the electrolysis method is applied to the Sn—Bi alloy plating solution prepared at a desired Bi ion ($Bi^{3+}$) concentration, the solid line indicates the concentration ratio of Bi ions ($Bi^{3+}$) to the Sn ions ($Sn^{2+}$) in the bath along with the elapse of the treatment period. The chain line indicates the Bi ion ($Bi^{3+}$) concentration in the bath along with the elapse of the treatment period. As apparent from the graph, applying an electrolysis treatment to the Sn—Bi alloy plating solution decreases the Bi ions ($Bi^{3+}$) in the bath as shown in the chain line. Thus applying the electrolysis treatment can remove substantially all of the Bi ions ($Bi^{3+}$) in the bath. On the other hand, the solid line indicates that Bi ions ($Bi^{3+}$) are removed with a higher priority in the Sn—Bi alloy plating solution.

Thus, as shown in FIG. 4A and FIG. 4B, Bi ions ($Bi^{3+}$) can be removed with a higher priority from the Sn—Bi alloy plating solution by applying the electrolysis treatment at a low current density to the Sn—Bi alloy plating solution. To realize this, adopts a process sequence according to which, first, the complexing agent for making the deposition potential of the Bi ions ($Bi^{3+}$) worse is removed from the Sn—Bi alloy plating solution at the step S2, and then the Bi ions ($Bi^{3+}$) in the Sn—Bi alloy plating solution are restored to a nobler state. As a result of this process sequence, in the present embodiment, the electrolysis treatment can be performed at a low current density by restoring Bi ions ($Bi^{3+}$) to a nobler state, which enables Bi ions ($Bi^{3+}$) to be removed more efficiently.

The present embodiment describes the case where substantially all of the Bi ions ($Bi^{3+}$) in the Sn—Bi alloy plating solution are removed by the aforementioned method; however, the Bi ion ($Bi^{3+}$) concentration in the plating solution of Sn alone can be reduced to 5 (PPM) or lower. Even when the Bi deposition is detected from the plating films formed with the plating solution, the Bi deposition concentration is at a level which can be treated as an impurity concentration. The Bi ion ($Bi^{3+}$) concentration in this plating solution is the same level as the concentration of impurities brought in by a Sn electrode member (anode) or chemicals such as Sn ions ($Sn^{2+}$) in the bath when a plating solution of Sn alone is newly prepared. Therefore, a plating solution from which the Bi ions ($Bi^{3+}$) have been removed by the aforementioned method and which contains Bi ions ($Bi^{3+}$) of the ppm order, can be treated substantially the same as the plating solution of Sn alone.

The following is a description about the process for applying a sedimenting treatment to a plating solution of substantially Sn alone from which the complexing agent and the Bi ions ($Bi^{3+}$) have been removed as shown at Step S4 of FIG. 1. As shown in FIG. 5, in the sedimenting treatment process, the aforementioned Bi ions ($Bi^{3+}$), electrolytic products other than the complexing agent, such as Sn ions ($Sn^{4+}$) and Bi ions ($Bi^{4+}$) are removed. First, some of the plating solution is taken from the plating bath and put in several beakers, then a first sedimenting agent is added to each of the beakers of the plating solution. In the respective beakers, the plating solution is stirred with a stirrer for 10 to 20 seconds.

The stirred plating solution is left for 30 minutes or so, and then a second sedimenting agent is added to the respective beakers. Later, the plating solution is stirred in the same manner as after the addition of the first sedimenting agent, and left for 30 minutes or so. Then, sedimented coagulants are checked to select the beakers that have achieved the desired objective, and the amount of plating solution to be recycled is calculated to determine the amounts of the first and second sedimenting agents to be added (Step S21).

The first sedimenting agent is added to the plating solution by the amount determined in Step S21, and the plating solution is stirred well (Step S22). The plating solution is left for 8 hours or so; the cloudiness of the plating solution is checked (Step S23); and the second sedimenting agent is added to the plating solution by the amount determined in Step S21. Then, the plating solution is stirred well in the same manner as after the addition of the first sedimenting agent (Step S24). Later, electrolytic products such as Sn ions ($Sn^{4+}$) and Bi ions ($Bi^{4+}$) form blocks, and the supernatant of the sedimented plating solution is subjected to the filtering treatment as mentioned above (Step S25). The filtered plating solution is either stored in the plating bath again or stored in another preliminary bath. On the other hand, in the preliminary bath in which a sedimenting treatment is in process, this filtering treatment operation follows it and the filtered plating solution is stored whenever necessary in the aforementioned plating bath or another preliminary bath.

In the sedimenting treatment process, when the finally filtered plating solution is again stored in the plating bath, the plating bath is used after being cleaned with an alkali solution and then being subjected to a neutralizing treatment with an acid solution. The electrode member made of Sn with a purity of 99.9% used in the Sn—Bi alloy plating solution can be used again after being cleaned well, or a new electrode member can be used.

Finally, the following is a description of the process for analyzing and correcting the plating solution of substantially Sn alone. As described above, in the process for preparing a plating solution of substantially Sn alone from a Sn—Bi alloy plating solution, in the active carbon treatment process (Step S2) for removing the complexing agent, some of the antioxidant as an additive may also be removed during the active carbon treatment. In addition, in the Bi removing process (Step S3), Sn ions ($Sn^{2+}$) are also deposited especially when the electrolysis method is employed for the deposition of Bi ions ($Bi^{3+}$). Although Sn ions ($Sn^{2+}$) are compensated by the dissolution of the anode, the Sn ion ($Sn^{2+}$) value cannot be a desired value with respect to the plating solution of Sn alone.

Therefore, in the analyzing and correcting process, some of the plating solution of Sn alone which has undergone the sedimenting treatment process is taken for chemical analysis, and insufficient ingredients such as an antioxidant are added. After this analyzing and correcting process, a desired plating solution of Sn alone is complete.

As described hereinbefore, the method for recycling of plating solutions according to the present embodiment includes preparing a plating solution of substantially Sn alone from, for example, a Sn—Bi alloy plating solution which has been conventionally used as a plating solution. In general, when a plating solution is newly electrolytically bathed, it is necessary to purchase and utilize various heavy metals and acids, which makes it necessary to carry out to research and analyzing methods for examining the ingredients of the plating solutions and administrating their concentrations from the beginning.

However, the plating solution has nearly the same ingredients as the conventionally used Sn—Bi plating solution except for the Bi ions ($Bi^{3+}$) and the complexing agent which is one of the additives to be removed from the plating solution. Therefore, for the plating process and plating solution administration with use of the newly prepared plating solution of substantially Sn alone, it is possible to employ the conventional method for analyzing Sn, acid, and additives which are the same ingredients as in the conventional plating solution. For the administration of the plating solution of Sn alone, the plating solution ingredients are analyzed, and insufficient ingredients are added to maintain a desired plating solution of Sn alone. In such a case, the frequency of the analysis and the addition method can be performed based on the conventional data. In the present embodiment, making use of the conventional data including the analysis of plating solutions in this manner can greatly reduce the time and cost for studying plating solutions. In the administration of the plating solution compositions, the conventional data can be utilized to facilitate the administrating operation.

Furthermore, a plating process can be performed by using a plating solution of Sn alone prepared from a Sn—Bi alloy plating solution to make the setting requirements during a plating process nearly the same as the setting requirements for the Sn—Bi alloy plating solution. The plating solution ingredients and the setting requirements during the plating process are nearly the same as the alloy plating solution, which can provide a desired appearance including the shape of the deposited grains of the finished plating film similar to the one obtained from the Sn—Bi alloy plating solution.

Furthermore, a plating solution which will not be used any longer as a result of the change in plating solutions can be recycled to make the effluent treatment of the plating solution unnecessary and to reproduce the plating solution. This results in a reduction in the effluent load and effluent cost of the plating solution. An effluent treatment of plating solutions causes sludge composed of chemicals containing heavy metal; however, the present embodiment can reduce the development of the sludge and eliminate the effluence of the plating solution to greatly reduce environmental loads.

Furthermore, use of a plating solution of Sn alone prepared from a conventionally used Sn—Bi alloy plating solution makes it possible to set nearly the same setting requirements during a plating process as the Sn—Bi alloy plating solution. This makes it possible to continue to use the conventional facilities including the plating devices so as to realize the preservation of the existing facilities, thereby greatly reducing the cost of equipment.

In addition, the present embodiment describes the case of preparing a plating solution of substantially Sn alone from a Sn—Bi alloy plating solution; however, this is not the only alloy plating solution to be used. For example, the same effects can be obtained by preparing a plating solution of substantially Sn alone from a plating solution of Sn—Ag alloy, Sn—Cu alloy, Sn—In alloy, or Sn—Zn alloy. The present embodiment also describes the case of removing substantially the entire complexing agent from the Sn—Bi alloy plating solution; however, it is not the only case possible. For example, it is also possible that at least some of the complexing agent is removed from the Sn—Bi alloy plating solution to make. Bi ions ($Bi^{3+}$) have a nobler deposition potential, thereby improving the deposition efficiency of the Bi ions ($Bi^{3+}$). Moreover, various modifications are possible within the range of the gist of the present invention.

What is claimed is:

1. A method for recycling of plating solutions, comprising the steps of: preparing an alloy plating solution containing two kinds of metallic materials which differ in standard electrode potential, the metallic materials being co-deposited on a conductive member; and removing substantially all of one metallic material from the alloy plating solution, thereby preparing a single metal plating solution composed of an other metallic material.

2. The method for recycling of plating solutions according to claim 1, wherein the single metal plating solution is used to apply a plating treatment to conductive member.

3. The method for recycling of plating solutions according to claim 1, wherein an additive contained in the alloy plating solution includes a complexing agent; at least some of the complexing agent is removed from the alloy plating solution; and the other metallic material in the single metal plating solution is deposited at a nobler potential than the potential at which the two kinds of metallic materials in the alloy plating solution are co-deposited.

4. The method for recycling of plating solutions according to claim 3, wherein an additive contains plural ingredients one of which includes the complexing agent; and the ingredients which are included in the additives and are removed together with the complexing agent are added to the single metal plating solution.

5. The method for recycling of plating solutions according to claim 3, wherein additives include an antioxidant; at least some of the antioxidant is removed together with the complexing agent; and the antioxidant is added to the single metal plating solution.

6. The method for recycling of plating solutions according to claim 1, wherein the one metallic material is removed by being deposited at least on an electrode member or a conductive member soaked in the alloy plating solution.

7. The method for recycling of plating solutions according to claim 6, wherein the other metallic material remaining in the single metal plating solution is compensated by the electrode member dissolving.

8. The method for recycling of plating solutions according to claims 1 to 7, wherein the one metallic material is bismuth, silver, copper, indium, or zinc, and the other metallic material is tin.

\* \* \* \* \*